United States Patent [19]

Elmore, Jr.

[11] 4,050,067
[45] Sept. 20, 1977

[54] AIRBORNE MICROWAVE PATH MODELING SYSTEM

[76] Inventor: Ethelbert P. Elmore, Jr., Hernon House 1103, Reston, Va. 22090

[21] Appl. No.: 679,082

[22] Filed: Apr. 21, 1976

[51] Int. Cl.$^2$ .................... G01S 9/00; G01D 9/08
[52] U.S. Cl. .................... 343/5 R; 343/5 CM; 343/17.1 R; 346/33 TP
[58] Field of Search ........... 73/384; 346/33 TP; 343/17.1 R, 5 CM, 5 R

[56] References Cited

U.S. PATENT DOCUMENTS

| | | | |
|---|---|---|---|
| 1,484,815 | 2/1924 | De Bothezat | 73/386 |
| 2,037,409 | 4/1936 | DuVander | 346/33 TP |
| 2,705,319 | 3/1955 | Dauber | 343/7 |
| 3,213,451 | 10/1965 | Alpers | 343/17.1 R |
| 3,235,873 | 2/1966 | Eddy, Jr. | 346/8 |

Primary Examiner—Maynard R. Wilbur
Assistant Examiner—Lawrence Goodwin
Attorney, Agent, or Firm—Cushman, Darby & Cushman

[57] ABSTRACT

An airborne geophysical measurement and recording system and apparatus in which radar signals are focused onto terrain below an aircraft flying in a straight line between microwave tower sites. The echo signals are detected and signals produced and recorded on a strip chart recorder indicating path profile and terrain reflectivity. In addition, atmospheric pressure, temperature and humidity data are recorded as functions of aircraft altitude, so that atmospheric refractivity gradients can be calculated, either by an on-board computer or later, and this factor taken into account during path design or performance simulation.

6 Claims, 1 Drawing Figure

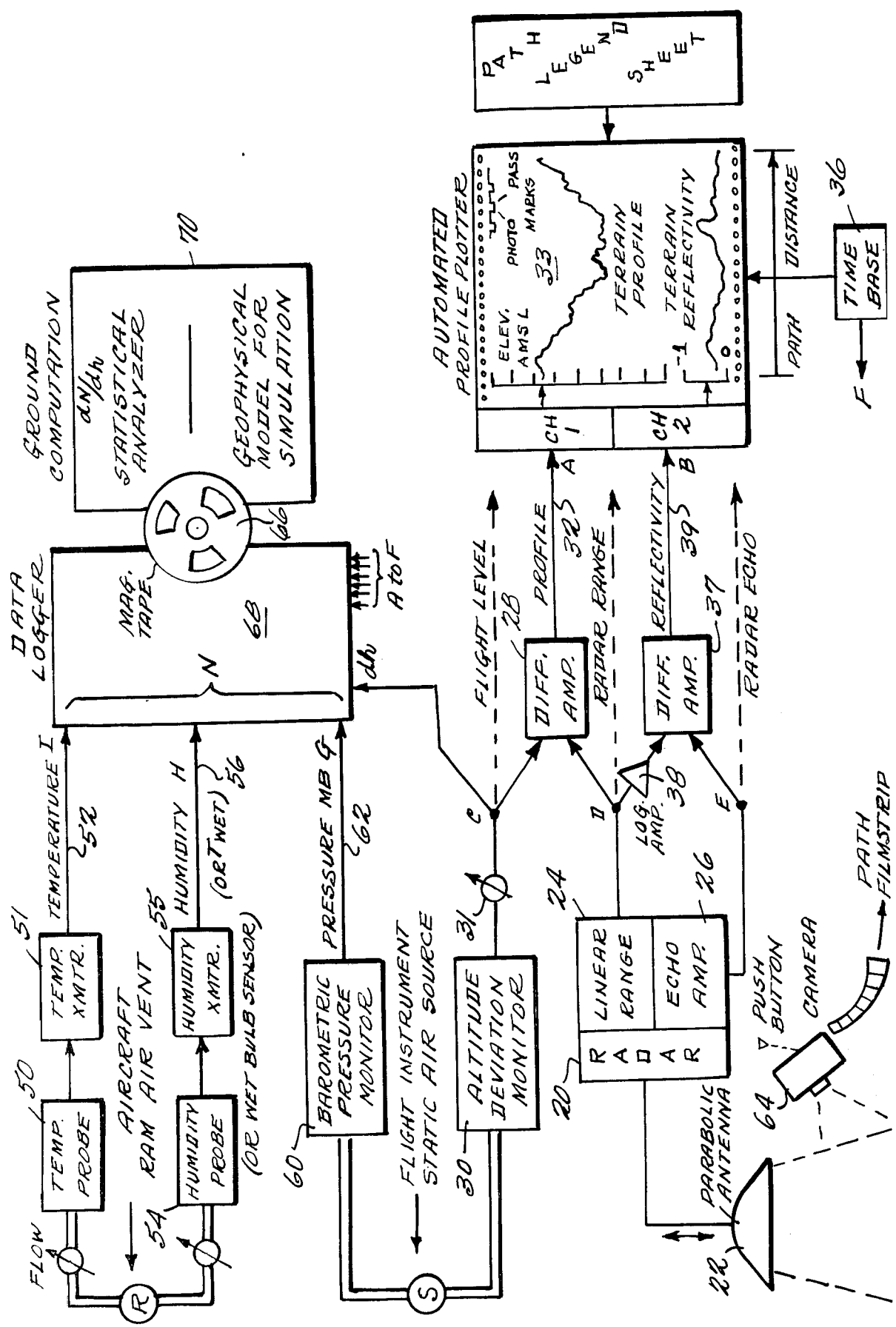

AIRBORNE MICROWAVE PATH MODELING SYSTEM

BRIEF DESCRIPTION OF THE PRIOR ART AND SUMMARY OF THE INVENTION

This invention relates to an airborne geophysical measurement system and method for electronically measuring and recording all parameters governing propagation over terrestrial microwave communication paths. This invention may be used for testing microwave paths, localizing fade sources and depths, optimizing transmission performance, designing for anti-correlated diversity protection, and predicting propagation reliability on a seasonal and long-term basis.

Microwave transmission has in recent years become an important part of the communication networks of the United States, carrying information of all sorts from tower to tower. Such transmission is essentially straight line although it may be refracted, i.e. bent up or down, in accordance with atmospheric conditions. Accordingly, it is important that the beam not intercept a hill or other obstacle even under unusual atmospheric conditions. Further, the positioning and height of the tower and the antenna used are also a factor in the effect of ground terrain, including reflectivity, on a transmitted signal. It is thus important to be able to predict before building an expensive installation the transmission problems which will occur under different atmospheric conditions and to design the facility accordingly.

The practice of microwave communication path design prior to installation has in the past been based on empirical clearance criteria over surveyed elevation profiles between tower sites, or on actual path testing employing temporary towers with variable antenna heights. An unpublished Bell system practice entitled "Microwave Path-Testing" describes these techniques in detail. Path clearance surveys have employed topographic maps, altimetry, theodolites, optical flashing, low-altitude radar profiling, or high-altitude photogrammetry to determine path elevations for calculation of static clearance criteria over obstructions. These survey methods each contain inherent limitations and potential hazards in portraying the actual path strip profile, and they all ignore the equally significant performance parameters of terrain reflectivity and atmospheric refractivity variations. These sporadic elevation surveys and static clearance designs have been generally adequate for non-reflective paths or microwave routes with communication traffic which tolerates moderate fading. Propagation reliability has been improved when necessary by diversity transmission frequencies or by space diversity reception with empirically separated antennas. Abritrary diversity design affords limited protection against structured fades produced by multi-surface reflections which vary with atmospheric refraction, but is not the complete answer.

These techniques, however, are not adequate to ensure that the microwave link will provide reliable transmission of digital and other information where high levels of information loss cannot be tolerated.

Many systems have been developed to provide information for radar mapping or reflectivity sensing by aerial surveys. The patent to Eddy, Jr. U.S. Pat. No. 3,235,873 describes a system in which a radar profile is recorded after being corrected for aircraft height above sea level. A camera is operated in conjunction with the strip chart recorder to provide a reference for the profile. Other patents describing systems of this general type include U.S. Pat. Nos. 3,213,451; 3,155,964; 3,144,631; 3,007,155; 2,979,715; 3,109,169; 3,242,484; 3,365,719; and 3,191,170.

These systems, however, do not provide sufficient or suitable data for microwave path modeling and simulation. This problem has been overcome in part by determining terrain reflectivity. Other patents describing reflectivity measurements includes U.S. Pat. Nos. 3,344,419 and 2,428,315.

Path testing with temporary towers has in the past been employed on heavy common carrier routes for tangential measurement of terrain reflectivity by staggering antenna heights geometrically to observe specific surface interference effects. An accurate path profile and sophisticated radio engineering analysis during short-term testing are required to gage the prevailing atmospheric refractivity effects, and changing atmospheric conditions may delay or nullify test results. These performance tests are valid for the static refractivity then prevailing, but not for dynamic effects of long-term atmospheric variations including extremely refractive conditions. Limited test tower heights may be inadequate to geometrically observe surface reflections which are masked during testing under normal atmospheric conditions, but may become exposed during superrefractivity corresponding to effective flat earth or concave earth curvature. The high cost of temporary tower erection dictates that path testing should be employed only for paths with potential reflection problems, so cautious practice results in many paths being tested unnecessarily, while other untested paths may exhibit unsuspected reflection sources.

Airborne path modeling provides relatively economical data on terrain reflectivity throughout all paths, so that simulations may be performed only on those paths with measured reflectivity which is exposed on the profile at significant atmospheric conditions. Airborne measurement of terrain reflectivity vertically is immune to the tangential atmospheric refractions which require gaging during path testing and often plague such tests by varying. Model performance simulation may be employed to duplicate the height-versus-loss curves measured by path testing with static refractivity. More significantly, simulation may be employed with controlled variation of refractivity in accordance with the atmospheric model time distribution to predict long-term propagation reliability. Seasonal variations in atmospheric conditions, terrain reflectivity, cultivation, flooding, snow or ice cover, or projected construction projects may also be computed on the model simulation. Reflectivity has been measured commercially in this fashion without range correction since December 1974.

Considering reflectivity substantially improves results but still does not provide information from which complete and realistic modeling can be carried out. Dynamic variation of atmospheric refractivity gradient also has been found to be an important factor.

Atmospheric refraction of microwave beams has been considered in conventional practice by empirical clearance criteria based on equivalent earth curvature, or by statistical treatment of meteorological data from radiosonde measurements at scattered weather reporting stations. The various clearance criteria are all static by nature, with empirically different values employed for geographical regions and terrain types. The usefulness of radiosonde statistics is limited, however, on microwave paths by the economics of discardable balloonlofted instrumentation, rapid ascent with measurement lag, imprecise pressure-actuated altitude reporting, diurnal bias of daily measurement at fixed Greenwich times, widely scattered stations, and terrain proximity effect on the lower 100-meter layer lapse, especially at airport locations not typical of path terrain.

The present invention relates to a unique system and method which measures and records all data needed to accurately model a given microwave path, including atmospheric refractivity. This is accomplished by an airbrone system in which a conventional radar signal is directed to the ground vertically in a focused beam and the echo detected. In the embodiment described in detail below, the leading edge of the echo is detected by a suitable range circuit to produce a linear range signal from which is subtracted in a differential amplifier a signal from an altitude monitor indicating aircraft height. The output of the differential amplifier is applied to one channel of a strip chart recorder to record the terrain profile. The amplitude of the echo signal is also detected by a conventional amplitude circuit to produce a second signal from which is subtracted an exponential output of the range circuit in a second differential amplifier to produce a signal indicating terrain reflectivity which is applied to the second channel of the strip recorder. Reflectivity and terrain profile are normally recorded continuously as the plane mounting the system flies in a straight line between the proposed tower sites. A camera mounted to obliquely photograph landmarks is normally used while placing a correspnding indication on the strip chart recorder for linear and lateral control reference.

To provide refractivity data, wet and dry bulb sensors are mounted on the airplane, for example in ram air inputs where air flow is fixed, to provide signals which indicate temperature and humidity. This data together with the atmospheric pressure and aircraft height are preferably recorded on magnetic tape. If desired, an on-board computer or other circuit can be used to directly calculate and provide an output indicating atmospheric refractivity gradient according to a known formula set forth below.

Many other objects and purposes of the invention will be clear from the following detailed description of the drawings.

BRIEF DESCRIPTION OF THE DRAWING

The drawing is a schematic block diagram of the unique airborne system of this invention.

DETAILED DESCRIPTION OF THE DRAWING

Reference is now made to the drawing which illustrates schematically the unique airborne system of this invention which records geophysical and atmospheric data which can then be used for modeling a microwave path between two proposed tower sites and to design or simulate that path to provide the best transmission characteristics.

A conventional vertical radar system 20 provides a sequence of pulses which are directed to the terrain below tha aircraft by a parabolic antenna 22 which focuses the beam. The echos received by antenna 22 are detected by the conventional circuitry within radar 20 to produce a conventional echo signal, which is applied both to a conventional linear range circuit which selects the first echo received by the radar 24 and to a conventional echo amplitude circuit 26. Circuit 24 senses the radar range of the highest obstruction of the terrain within the area encompassed by the beam. Echo amplitude circuit 26 detects the maximum amplitude of the echo and produces a signal indicating that value which may be later related to the reflectivity of water. Both linear range circuit 24 and echo amplitude circuit 26 provide signal outputs which vary in accordance with their respective functions.

The output of circuit 24 is applied as one input to differential amplifier 28 which receives as the other input a signal from a conventional altitude deviation monitor 30. Monitor 30 provides an output signal indicating the aircraft height above seal level or some other reference. Potentiometer 31 adjusts for vertical barometric gradient. Thus, subtracting the output of potentiometer 31 from the output of range circuit 24 in differential amplifier 28 provides a profile output signal on line 32 indicating the height of the obstructions at the highest points scanned along the flight path of the aircraft. As indicated above the aircraft normally flies between the tower sites so the profile signal on line 32 indicates the height of the profile along that path.

Line 32 is connected to one channel of a conventional strip chart recorder 33. Time base generator 36, derived e.g., from a precision 60 Hz source, moves the strip chart recorder, for example while a pen is operated in accordance with the voltage appearing at line 32 to produce conventionally a record of the terrain profile.

The output of echo amplitude circuit 26 is applied to differential amplifier 37 together with the output of circuit 24 via logarithmic amplifier 38 to produce a reflectivity output signal at line 39 which indicates the terrain reflectivity. Logarithmic amplifier 38 corrects for the inverse exponential function of the echo with range. During previous use, the reflectivity output of circuit 26 was directly recorded on recorder 33. However, correcting this signal for the range produces a much more accurate record, particularly over mountainous terrain. In the described embodiment, line 39 is connected to the second channel of strip chart recorder 33.

As discussed briefly above, the reflectivity and profile signals provide valuable information regarding the geophysical characteristics of the microwave path, but such information is not sufficient to provide a complete and dynamic basis for modeling such a path and for designing the system in accordance therewith. In order to provide such dynamic information it is desirable to derive and record information which can be used to determine atmospheric refractivity gradient, and it may be desirable to determine and record such variations of refractivity on board the aircraft, by measuring atmospheric temperature, humidity and pressure as functions of height.

A conventional temperature sensor 50, for example a dry bulb mounted in a ram air input where the flow rate is fixed, provides an output signal on line 52 via transmitter 51 indicating the atmospheric temperature. A humidity sensor 54, e.g., a wet bulb, mounted separate from the dry bulb sensor 50, provides an output signal which when correlated with the dry bulb temperature indicates the humidity of the air. Where temperature conditions preclude use of wet bulbs, any other suitable humidity sensor may be used.

Further, a second conventional barometric pressure monitor 60, for example similar to deviation monitor 30 but with broader range, provides an output signal on line 62 which indicates the barometric pressure in millibars.

A push button camera 64 is also preferably used for photographing at an oblique angle landmarks such as rivers, highways, and the like with a suitable indication being placed on the strip chart recorder 33 as indicated on the drawing.

The various atmospheric data which is derived is preferably recorded continuously on a magnetic tape deck 66 via a conventional data logger 68 to provide statistical data for dynamic atmospheric modeling. Such data may be acquired during path survey flights, during takeoffs and landings, and while cruising over various areas in different seasons. The unsuspected prevalence of linear lapse in refractivity with height permits efficient acquisition of such data in statisticlly meaningful volume at cruising altitudes, e.g., 1000 feet above ground, for extrapolation to the lower air layers traversed by the microwave beam.

The data which is used to determine refractivity can simply be recorded in the air and then calculated on the ground or an on-board computer can be used for that purpose to compute the refractivity gradient dN/dh. This computer can be a simple digital or analog computer which first determines the refractivity according to the known formula for refractivity which is:

$$N = 77.6 \, P/T + 3.73 \times 10^5 \, e/T^2$$

where N is in parts per million exceeding unity, P is the atmospheric pressure in millibars, T is the temperature in degrees Kelvin, and e is the partial pressure of water vapor in millibars. The refractivity gradient, dN/dh, is computed per kilometer of height for the lower air layer traversed by the microwave beam.

Magnetic tape deck 66 may also record the geophysical model for later simulation.

Many changes and modification in the above described embodiment of the invention can, of course, be carried out. If desired a larger strip chart recorder can be utilized to record all of the information continuously, although the particular arrangement described has been found to be satisfactory and efficient. In lieu of the parabolic antenna, the vertical radar beam may be focused for the required strip width control and gain by means of a horn reflector or a parabola of rods curved in only one plane. As an alternative to conventional radar, a laser beam can be used to provide the obstruction profile signal.

Accordingly, the scope of the invention is intended to be limited only by the scope of the appended claims.

What is claimed is:

1. An airborne geophysical measurement and recording system comprising:
    radar means for producing a focused radar signal, directing said signal to a terrain area below said aircraft and successively receiving a return signal from said terrain area,
    a linear range circuit connected to the output of said radar means for successively producing radar range signals from said return signal indicating the highest obstruction in said terrain area,
    an amplitude circuit connected to the output of said radar means for producing an echo magnitude signal which varies as a function of the maximum echo magnitude of said return signal,
    temperature means for detecting the atmospheric temperature and producing a temperature signal which varies as a function thereof,
    humidity means for detecting atmospheric humidity and producing a humidity signal which varies as a function thereof,
    aircraft height means for detecting aircraft altitude and producing an altitude signal,
    profile means for producing a profile signal which varies as a function of the difference between said range signal and said altitude signal,
    reflectivity means for producing a reflectivity signal which varies as a function of said echo magnitude signal,
    pressure means for detecting absolute atmospheric pressure and producing a pressure signal,
    means for recording said temperature signal, said humidity signal, said pressure signal, said altitude signal, said profile signal and said reflectivity signal, and
    means connected to said pressure means, and wet temperature means for producing from a plurality of data points taken at different altitudes a refractivity gradient dN/dh according to the relation $$N = 77.6 \, P/T + 3.73 \times 10^5 \, e/T^2$$

where N is the radio refractivity in parts per million exceeding unity, h is the altitude at which the data points are taken, P is a data point representing the atmospheric pressure in millibars, T is a data point representing the temperature in degrees Kelvin, e is a data point representing the partial pressure of water vapor in millibars, and dN/dh is the refractivity gradient per kilometer of height in the lower air layer traversed by the microwave beam.

2. A system as in claim 1 wherein said recording means includes a strip chart recorder.

3. A system as in claim 2 wherein said temperature means includes a dry bulb temperature detector and said humidity means includes a wet bulb temperature detector.

4. A system as in claim 1 wherein said recording means includes means for recording said temperature signal, said humidity signal, said pressure signal, said aircraft height signal, said profile signal and said reflectivity signal on magnetic tape.

5. A system as in claim 1 wherein said radar means includes a parabolic antenna directed vertically below the aircraft.

6. A system as in claim 1, wherein said reflectivity means includes a logarithmic amplifier connected to the output of said range circuit and a differential amplifier connected to the output to said logarithmic amplifier and to the output of said echo amplitude circuit for producing said reflectivity signal which varies as a function of the difference between said amplitude signal and the output of said logarithmic amplifier.

* * * * *